Oct. 8, 1957  F. P. PLOTKIN  2,809,076
VEHICLE WHEEL COVERS
Filed April 19, 1955  2 Sheets-Sheet 1

FREDERIC P. PLOTKIN
INVENTOR.

BY Robert M. McManigal
Attorney

Oct. 8, 1957 F. P. PLOTKIN 2,809,076
VEHICLE WHEEL COVERS
Filed April 19, 1955 2 Sheets-Sheet 2
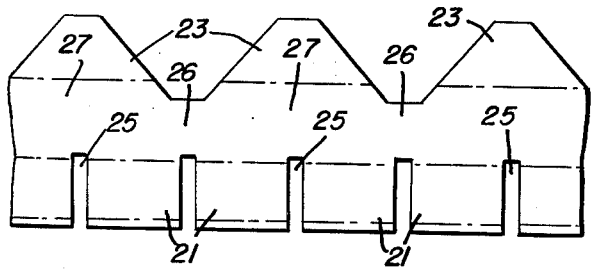
FIG. 5.
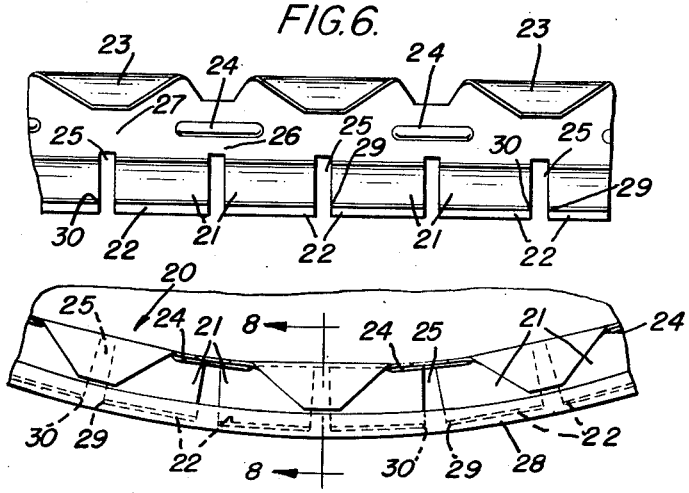
FIG. 6.
FIG. 7.
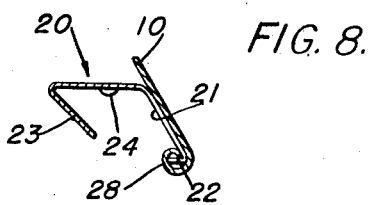
FIG. 8.
FREDERIC P. PLOTKIN
INVENTOR.
BY Robert M. McManigal
Attorney

United States Patent Office 2,809,076
Patented Oct. 8, 1957

2,809,076

VEHICLE WHEEL COVERS

Frederic P. Plotkin, Los Angeles, Calif., assignor, by direct and mesne assignments, to Shore-Calnevar, Inc., a corporation of California Application April 19, 1955, Serial No. 502,348

6 Claims. (Cl. 301—37)

This invention relates to vehicle wheel covers and more particularly to retaining means for holding wheel covers on the outer sides of a wheel. One of the disadvantages of a decorative wheel cover is that it sometimes becomes disengaged from the wheel of an automobile.

An object of my invention is to provide a wheel cover which absorbs the road shocks which tend to dislodge the wheel cover from the wheel of the vehicle.

Another object of my invention is to provide a wheel cover with retaining means which allows for greater deflection of the rim under normal operating conditions without setting up stresses in the wheel cover or tending to cause the wheel cover to lose its bite in the surface of the rim and work loose.

Another object of my invention is to provide a wheel cover with retaining means in which the retaining means are secured to the wheel cover body by spring members.

Another object of my invention is to provide a wheel cover which is provided with retaining means which are economical to manufacture.

Another object of my invention is to provide a simple arrangement whereby the retaining means contains a built-in axial shock absorber which tends to dampen abnormal road shocks.

My invention has many other objects, advantages and features, some of which, with the foregoing, will be set forth in the following description where I shall outline one form of my invention which I have selected for illustration in the drawings accompanying and forming part of the present specification.

Referring to the drawings:

Fig. 5 is a face view of a portion of a stamping from which the annular resilient band is made;

Fig. 6 is a fragmentary view corresponding to Fig. 5 but showing the stamping after it has been formed;

Fig. 7 is a fragmentary rear view of a portion of the cover showing the manner in which the resilient segments of the part shown in Fig. 6 are secured under a bead formed on the cover rim; and Fig. 8 is a fragmentary section taken as indicated at the line 8—8 of Fig. 7.

Figure 1:
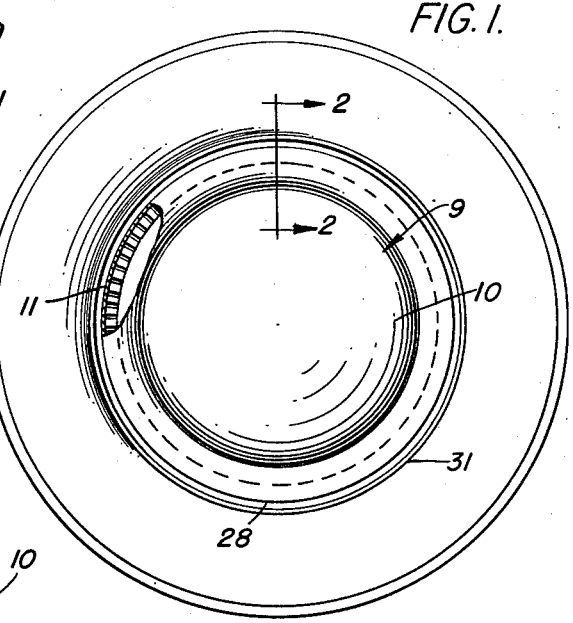
Fig. 1 is a side view of a wheel showing my novel wheel cover applied thereto and partly broken away to illustrate the retaining portions.

In the drawings the numeral 9 designates a wheel cover which includes a wheel cover body 10 having an outer peripheral portion 11 which is adapted to be rolled over as hereinafter set forth. An annular resilient band 20 made of spring material or the like, for example, 1050 high carbon steel, is provided with a series of outwardly splayed resilient segments 21 having upturned edges 22 and bent notched teeth 23 radiating outwardly from the annular band 20. The annular band 20 is preferably provided with strengthening embossments 24 between the circumferentially spaced notched teeth 23.

This construction is easy and economical to manufacture. For example, the annular band 20 may be formed from flat coiled material with conventional dies and requires no roll forming or stretch forming operations. The spacing between the notched teeth and the oppositely located spring segments is such as to allow for a simple change in the stop and cut-off position of the blank and form die in order to accommodate the manufacture of bands of different lengths for wheels of different sizes. As an instance of this arrangement, the flat coiled material may be passed through a progressive die in which the material is first parted down the center in a serrated manner to provide two bands each having notched tooth contours, then the outer edges of each band are blanked to provide the spring segments. The teeth 23 of each band, the spring segments 21, and the upturned edges 22 are then formed in their final shape. After the embossments 24 are made, the bands are cut off to the desired predetermined length. In the form shown in the drawings, the openings 25 between adjacent spring segments 21 are located in the mid-portions 26 between adjacent teeth and opposite the center portions 27 of the teeth 23.

When the ends of the band 20 are welded together the band takes an annular shape with the circumferentially spaced outwardly splayed spring segments 21 with the upturned edges 22, and the bent-over notched teeth 23.

The outer peripheral portion 11 of the cover body is then rolled over, around and behind the upturned edges 22 of the spring segments 21 as shown in Fig. 7, thereby securely locking the segments 21 in the annular bead 28 so that the segments 21 cannot be pulled out from their locked position.

The sharp corners 29, 30 of the upturned edges 22 bite into the internal wall of the annular bead 28 and thereby prevent radial movement or migration of the band 20 with respect to the cover body 10. This prevents radial movement of the retaining band 20 with respect to the cover body 10 during the polishing operation of the cover body and while the wheel cover is in use on a wheel of an automobile.

Figure 2:
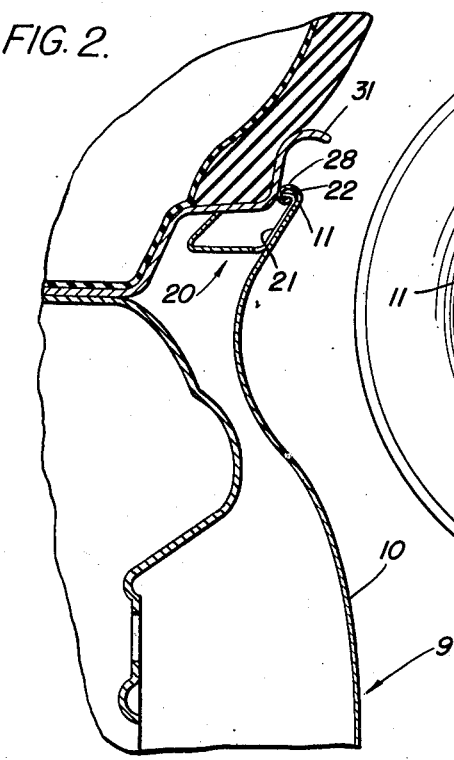
Fig. 2 is an enlarged fragmentary cross-sectional view taken on substantially the line 2—2 of Fig. 1.

The wheel cover 9 is adapted to be pushed onto the wheel to the position shown in Fig. 2. The diameter of the extremities of the teeth 23 is such that when the wheel cover is pushed into position the teeth 23 are deflected and by their reaction apply pressure outwardly and bite into the rim surface to retain the wheel cover in position on the wheel. As shown in Fig. 2, the spring segments 21 lie tightly against the inner surface of the cover body 10.

The spring fingers or segments 21 are yieldable sufficiently to allow controlled axial movement of the wheel cover with respect to the wheel and thus limit or diminish to a degree the axial tugging movement caused by road shock that thereby tends to dislodge the wheel cover retaining means from its toothed tension bite in position on the automobile wheel rim.

When the wheel is subjected to abnormal vibration, the spring segments 21 move away from a position adjacent to the inner side of the cover body with which they normally contact under tension before the notched teeth 23 are dislodged from their bite into the wheel rim. This action will be evident from Figs. 3 and 4, which show the wheel disc 9 as it is being removed from the wheel by means of a screw driver or other prying tool.

Figure 3:
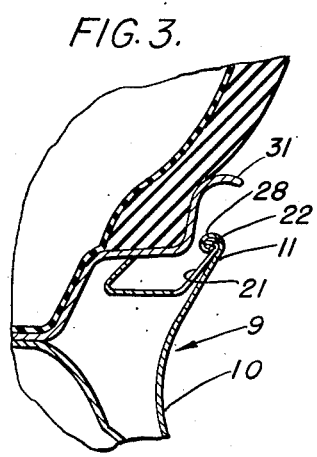
Figs. 3 and 4 are similar to Fig. 2 but show the cover at different stages of removal from the wheel.
Figure 4:
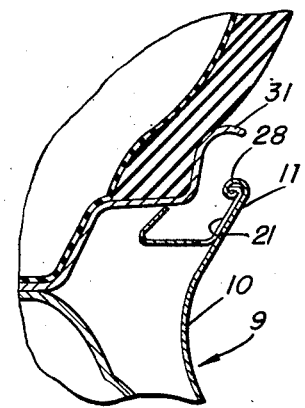

Fig. 3 shows the initial removal of the wheel cover 9 from the wheel. The resilient spring segments 21 have been moved away from their tensioned position against the inner side of the cover body 10, thus allowing for limited axial movement of the cover body 10 with respect to its mounted position as shown in Fig. 2. In other words, the cover body 10 is moved away from the position in which the bead 28 is tight against the rim 31. As the notched teeth 23 lose their bite into the rim 31 due to extreme axial movement of the cover body 10 away from the wheel, the spring segments 21 again move into tensioned position against the inner side of the cover body 10 as shown in Fig. 4. The wheel cover 9 may then be removed from the wheel by holding the wheel body 10 around its periphery and pulling the wheel cover 9 away from the wheel.

From the foregoing description taken in connection with the foregoing drawings, the uses, advantages, and operation of the wheel cover of my invention will be readily understood by those skilled in the art to which the invention appertains. While I have described one embodiment of my invention, I desire to have it understood that the form shown is merely illustrative and that the invention is not to be limited to the details disclosed herein, but is to be accorded the full scope of the appended claims.

I claim:

1. In a wheel cover for disposition at the outer side of a vehicle wheel, a circular cover body, and a resilient band secured to the marginal edge of said cover body, said band having a continuous central annular portion, a plurality of circumferentially spaced, outwardly splayed, individually resilient segments extending from the outer end of said annular portion, said cover body having the outer peripheral portion thereof secured to the outermost ends of said segments to thereby prevent rotational movement of said band with respect to said cover body, and a plurality of circumferentially spaced wheel cover retaining teeth extending from the inner end of said annular portion, the ends of said teeth projecting axially and radially outwardly to engage with the vehicle wheel.

2. In a wheel cover as recited in claim 1, wherein the spaces between adjacent resilient segments being disposed opposite the mid-portions between adjacent teeth and the center portions of said teeth.

3. In a wheel cover for disposition at the outer side of a vehicle wheel, a circular cover body, and a resilient band secured to the marginal edge of said cover body, said band having a continuous central annular portion, a plurality of circumferentially spaced, outwardly splayed, individually resilient segments extending from the outer end of said annular portion, said segments having angular corners at their outermost ends, said cover body having the peripheral portion thereof rolled over and behind the outermost ends of said segments to provide an annular bead securely locking the ends of said segments to the cover body and thereby prevent rotational movement of said band with respect to said cover body, and a plurality of circumferentially spaced wheel cover retaining teeth extending from the inner end of said annular portion, the ends of said teeth projecting axially and radially outwardly to engage with the vehicle wheel.

4. In a wheel cover for disposition at the outer side of a vehicle wheel, a circular cover body, and a resilient band secured to the marginal edge of said cover body, said band having a continuous central annular portion, a plurality of circumferentially spaced, outwardly splayed, individually resilient segments extending from the outer end of said annular portion, said resilient segments having upturned edges at their outermost ends, said cover body having the peripheral portion thereof rolled over and behind the upturned edges of said segments to provide an annular bead securely locking the ends of said segments to the cover body and thereby prevent radial inward and rotational movement of said band with respect to said cover body, and a plurality of circumferentially spaced wheel cover retaining teeth extending from the inner end of said annular portion, the ends of said teeth projecting axially and radially outwardly to engage with the vehicle wheel.

5. In a wheel cover for disposition at the outer side of a vehicle wheel, a circular cover body, and a resilient band secured to the marginal edge of said cover body, said band having a continuous central annular portion, a plurality of circumferentially spaced, outwardly splayed, individually resilient segments extending from the outer end of said annular portion, said cover body having the outer peripheral portion thereof secured to the outermost ends of said segments to thereby prevent rotational movement of said band with respect to said cover body, a plurality of circumferentially spaced wheel cover retaining teeth extending from the inner end of said annular portion, the ends of said teeth projecting axially and radially outwardly to engage with the vehicle wheel, and said resilient band having circumferentially extending strengthening embossments disposed in the annular portion thereof between adjacent teeth.

6. In a wheel cover for disposition at the outer side of a vehicle wheel, a circular cover body, and a resilient band secured to the marginal edge of said cover body, said band having a continuous central annular portion, a plurality of circumferentially spaced, outwardly splayed, individually resilient segments extending from the outer end of said annular portion, said cover body having the peripheral portion thereof rolled over and behind the ends of said segments, said segments being under stress such that they resist axial movement of said band away from said cover body while permitting limited axial movement between said band and cover body in response to abnormal road shocks encountered in use, and a plurality of circumferentially spaced wheel cover retaining teeth extending from the inner end of said annular portion, the ends of said teeth projecting axially and radially outwardly to engage with the vehicle wheel.

References Cited in the file of this patent

UNITED STATES PATENTS

| | | |
|---|---|---|
| 2,552,916 | Becker | May 15, 1951 |
| 2,569,482 | Lyon | Oct. 2, 1951 |
| 2,624,628 | Lyon | Jan. 6, 1953 |
| 2,624,639 | Lyon | Jan. 6, 1953 |
| 2,729,508 | Lyon | Jan. 3, 1956 |